United States Patent
Lawlor et al.

(10) Patent No.: US 7,349,829 B1
(45) Date of Patent: Mar. 25, 2008

(54) DATA LOGGER

(75) Inventors: Joseph F. Lawlor, Arlington, MA (US); Joseph D. Musto, Dover, MA (US); Jerome M. Donovan, Cape Elizabeth, ME (US); Jeffrey M. Hardy, Medford, MA (US)

(73) Assignee: Reference Diagnostics, Inc., Bedford, MA (US)

( * ) Notice: Subject to any disclaimer, the term of this patent is extended or adjusted under 35 U.S.C. 154(b) by 0 days.

(21) Appl. No.: 11/439,891

(22) Filed: May 24, 2006

Related U.S. Application Data

(60) Provisional application No. 60/685,150, filed on May 27, 2005.

(51) Int. Cl.
*G06F 15/00* (2006.01)

(52) U.S. Cl. ...................................... 702/187
(58) Field of Classification Search ................ 702/187
See application file for complete search history.

(56) References Cited

U.S. PATENT DOCUMENTS

| | | | |
|---|---|---|---|
| 4,259,548 A * | 3/1981 | Fahey et al. .................. | 379/38 |
| 5,623,416 A | 4/1997 | Hocker, III | |
| 6,038,669 A * | 3/2000 | Yang ........................... | 713/300 |
| 6,826,664 B2 | 11/2004 | Hocker, III et al. | |
| 6,883,037 B2 | 4/2005 | Kadatch et al. | |

* cited by examiner

*Primary Examiner*—John Barlow
*Assistant Examiner*—Stephen J Cherry
(74) *Attorney, Agent, or Firm*—Fish & Richardson P.C.

(57) ABSTRACT

A data logger that avoids wasting power when data gathering is not needed (or is done by other means), but is activated automatically, without the need for human intervention, when it is needed. The data logger senses and stores data when a primary power source has failed. The data logger includes at least one back-up power source, and a detector switch connected to a primary power source and to one or more back-up power sources, the detector-switch detecting a condition indicative of the primary power source failure state, and connecting at least one back-up power source to provide power to the sampler, the storage medium and the sensor upon detection of the failure condition.

16 Claims, 1 Drawing Sheet

DATA LOGGER

CROSS-REFERENCE TO RELATED APPLICATIONS

This application claims priority to U.S. Provisional Application Ser. No. 60/685,150, filed on May 27, 2005.

TECHNICAL FIELD

This invention provides a data logger, e.g. one that logs temperature or other data, when there is a loss of power, and that activates automatically without the need for human intervention when the power fails.

BACKGROUND

Data loggers log information over a desired period of time. Typically, they periodically sample input from a sensor, so that the sensor reading at each sampling may be stored and retrieved later together with the time of sampling. For example, to log temperature readings, a temperature sensor may be sampled and the temperature readings are stored.

There are many uses for data loggers, but one use of particular interest is to monitor temperature, for example in food storage or in a laboratory setting, to verify whether the temperature remained within desired ranges and, if not, to know how long the temperature remained outside the desired range. One such use is food storage. Another is to monitor the environment used for animal or plant husbandry. Yet another is for longer term laboratory experiments.

Data logs for temperature are particularly important for periods in which environmental control machinery is disrupted, for example, by a power outage. If a food freezer loses power, it is critical to have a log of temperature over the outage period that provides reliable information about the duration and level of temperatures within or exceeding a prescribed food storage temperature. In these situations, it is important that the logger have adequate back-up power to perform its function. Data loggers are described in U.S. Pat. No. 6,883,037, U.S. Pat. No. 6,826,664 and U.S. Pat. No. 5,623,416.

SUMMARY

We have discovered an improved data logger that avoids wasting power when data gathering is not needed, but is activated automatically, without the need for human intervention, when it is needed. The data logger senses and stores data when a primary power source has failed. It includes:
 a) a sensor providing a sensor output signal during a primary power source failure state,
 b) a sampler connected to the sensor to sample the output signal from the sensor at one or more designated time intervals during the primary power source failure state, and
 c) a storage medium connected to receive and store data representative of the sampled sensor output,
 d) at least one back-up power source, and
 e) a detector switch connected to a primary power source and to one or more back-up power sources, the detector-switch detecting a condition indicative of the primary power source failure state, and connecting at least one back-up power source to provide power to the sampler, the storage medium and the sensor upon detection of the failure condition.

In preferred embodiments, the sampler does not sample output from the sensor in the absence of detection of failure of said primary power source (e.g., an AC power source). The primary power source may power a refrigeration device, in which case the sensor (e.g. a thermistor) may be positioned to measure an environmental condition at a location cooled by the refrigeration device. In general, there is no reason to use the primary power source to power one or more of features a), b) and c) of the data logger, because the data logger is only used when the primary power source has failed. To conserve the back-up power, the detector senses resumption of the primary power source and, in response to resumption of the primary power source, the detector signals the switch to terminate sampling. The sensor may be one that provides a signal representative of conditions other than temperature. For example, the sensor may be an electrical sensor (for example to detect current and/or voltage). The sensor may detect pressure, for example barometric pressure and differential pressure to verify that a negative pressure condition was not compromised by a power outage. The sensor may detect airborne particles to verify that air purity has been compromised. In biological or medical applications, the sensor may sense conditions related to biological functions, such as pH, $O_2$, $CO_2$, biological nutrients, metabolic waste or other conditions important to assessing life processes.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
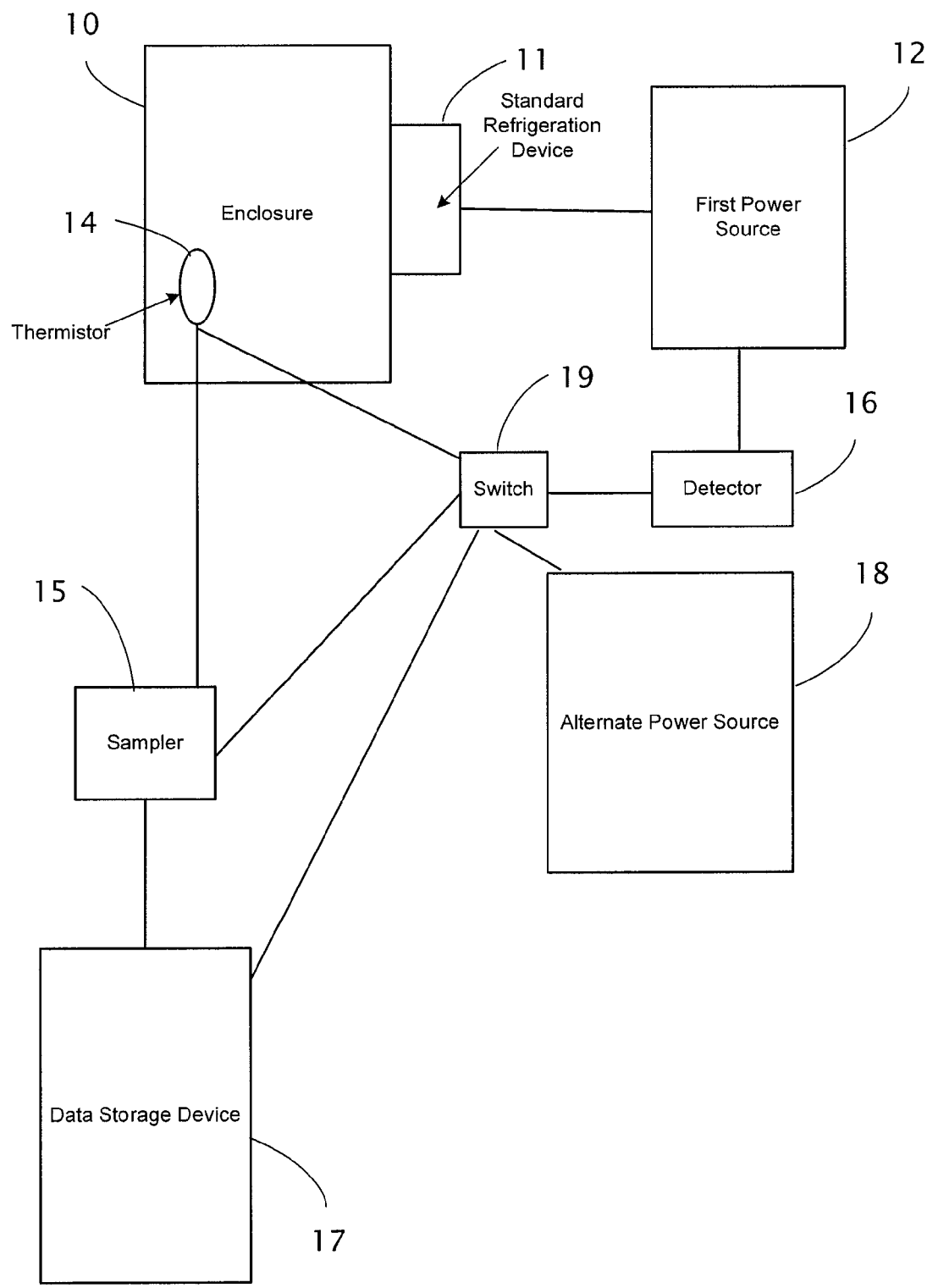
FIG. 1 is a diagrammatic representation of data logger components and connections specific for temperature monitoring.

In FIG. 1, an enclosure 10 is subjected to control over an environmental condition, such as temperature, by means of a standard refrigeration device 11 powered by a first power source 12, typically AC power. Thermistor 14 senses temperature within the enclosure 10, which provides an input signal to sampler 15. Output of sampler 15 is provided to data storage device 17.

Detector 16 is connected to or in-line with power source 12, to detect a failure condition in power source 12. Detector 16 is also connected to switch 19, which is activated upon detection of the failure condition, connecting alternate power source 18 to sampler 15, as well as to storage device 17 and to thermister 14. Thermister 14 may be powered directly from alternative power source 18 or indirectly through sampler 15. Once activated by detector 16 and switch 19, sampler 15 samples output signals from thermistor 14. Output signals (either directly from thermistor 14 or via sampler 15) are delivered to a storage device 17 where they are stored. The storage device 17 includes a time and date stamp to provide an electronic record of the time/date for each reading from the thermistor. Time stamping of collected data shows the relationship of time and temperature to determine product integrity.

The stored signals provide a record of readings from the thermistor over time, thus providing a basis to determine whether the failure of power source 12 and the consequent loss of refrigeration by device 11 render the contents of enclosure 10 unsafe.

Detector 16 remains connected to power source 12 to detect cessation of the failure condition. Upon detection of cessation of the failure condition, detector 16 and switch 19 may terminate the use of alternative power source 18, and of the sampling and storage of data from the thermistor.

The device of FIG. 1 has the advantage of conserving power by not sampling and storing signals while primary power source 12 is operative, and automatically (without the need for human intervention) activating the data logging function when the primary power source fails.

Certain embodiments of the invention have been described. Nevertheless, it will be understood that various modifications may be made without departing from the spirit and scope of the invention. For example, additional power sources may be provided separately to components such as the sampler, the thermistor and/or the data storage device, and those additional power sources may be controlled by the detector/switch in a manner similar to the control of power source 18. For example, the thermistor may have its own battery power source which is activated by detector 16. Temperature is only used as one example of the application of the data logger invention, and not meant to represent all possible signal inputs as claimed in this invention. Accordingly, other embodiments are within the scope of the following claims.

What is claimed is:

1. A data logger for sensing and storing data when a primary power source has failed, comprising
   (a) a sensor providing a sensor output signal,
   (b) a sampler connected to the sensor to sample the output signal from the sensor at one or more designated time intervals during the primary power source failure state, and
   (c) a storage medium connected to the sampler to receive and store data representative of the sampled sensor output,
   the data logger further comprising,
   (d) at least one back-up power source,
   (e) a detector-switch connected to a primary power source and to one or more back-up power sources, the detector-switch detecting a condition indicative of the primary power source failure state, and connecting at least one back-up power source to provide power to the sampler, the storage medium and the sensor upon detection of the condition indicative of the primary power source failure state, and to activate the sampler to sample the sensor output signal, and to store data representative of the sampled sensor output.

2. The data logger of claim 1 in which the sampler does not sample output from the sensor in the absence of detection of failure of said primary power source.

3. The data logger of claim 1 or claim 2 in which the primary power source powers a refrigeration device, and the sensor is positioned to measure an environmental condition at a location cooled by the refrigeration device.

4. The data logger of claim 1 or claim 2 in which the primary power source does not power one or more of features a), b) and c) of the data logger.

5. The data logger of claim 1 or claim 2 in which the primary power source powers at least two of features a), b) and c) of the data logger.

6. The data logger of claim 1 or claim 2 in which the primary power source is an AC power source.

7. The data logger of claim 6 in which the primary power source does not power one or more of features a), b) and c) of the data logger.

8. The data logger of claim 6 in which the primary power source powers at least two of features a), b) and c) of the data logger.

9. The data logger of claim 3 in which the sensor is a temperatures sensor.

10. The data logger of claim 7 in which the temperature sensor is a thermistor, and the sensor output is indicative of the thermistor temperature.

11. The data logger of claim 1 or claim 2 in which the detector further senses resumption of the primary power source and, in response to resumption of the primary power source, the detector terminates sampling.

12. The data logger of claim 1 or claim 2 in which the sensor provides an output signal representative of barometric pressure, differential pressure or both.

13. The data logger of claim 1 or claim 2 in which the sensor provides an output signal representative of current, voltage, or airborne particles.

14. The data logger of claim 1 or claim 2 in which the sensor provides an output signal representative of an environmental condition related to biological function.

15. The data logger of claim 1 or claim 2 in which the environmental condition is one that affects biological material positioned at or near the sensor.

16. The data logger of claim 15 in which the environmental condition is pH, $O_2$, $CO_2$, humidity, a biological nutrient, or a metabolic waste.

* * * * *

UNITED STATES PATENT AND TRADEMARK OFFICE
CERTIFICATE OF CORRECTION

PATENT NO. : 7,349,829 B1  Page 1 of 1
APPLICATION NO. : 11/439891
DATED : March 25, 2008
INVENTOR(S) : Joseph F. Lawlor et al.

It is certified that error appears in the above-identified patent and that said Letters Patent is hereby corrected as shown below:

-Column 4, Line 23 replace "temperatures" with -- temperature --

Signed and Sealed this

Eighteenth Day of November, 2008

JON W. DUDAS
*Director of the United States Patent and Trademark Office*

UNITED STATES PATENT AND TRADEMARK OFFICE
CERTIFICATE OF CORRECTION

PATENT NO. : 7,349,829 B2 Page 1 of 1
APPLICATION NO. : 11/439891
DATED : March 25, 2008
INVENTOR(S) : Joseph F. Lawlor et al.

It is certified that error appears in the above-identified patent and that said Letters Patent is hereby corrected as shown below:

Title Page
- (73) Assignee: replace "Reference Diagnostics, Inc." with correct Assignee,
-- DocuTemp Incorporated -- per assignment filed February 19, 2008 at 020529/0975.

Signed and Sealed this

Twelfth Day of May, 2009

JOHN DOLL
*Acting Director of the United States Patent and Trademark Office*